Oct. 18, 1927.
H. M. PFLAGER
CAR TRUCK
Filed Dec. 18, 1925
1,646,214
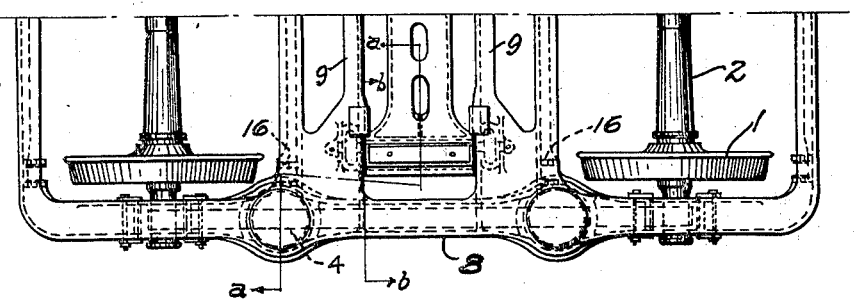
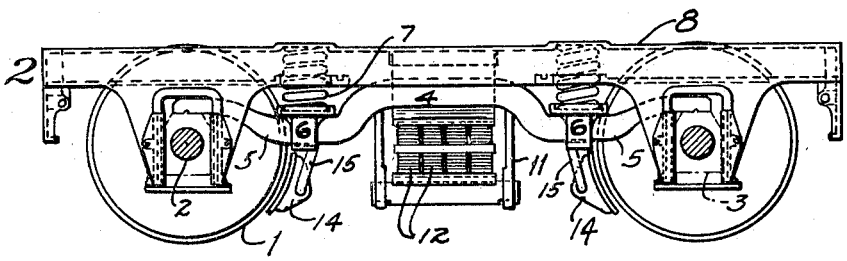
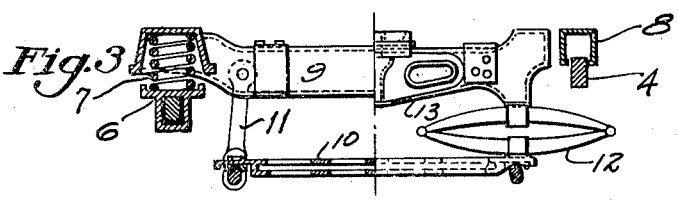
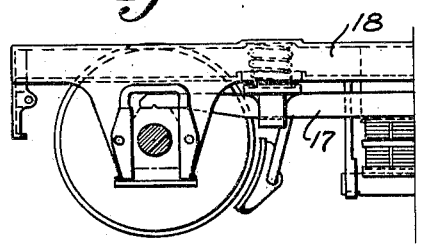
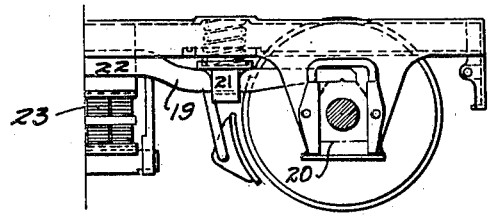
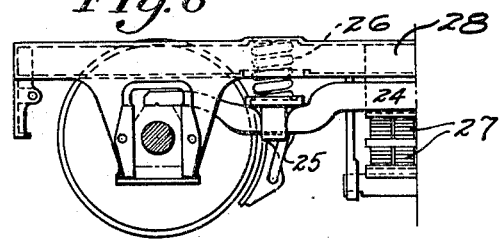
Inventor
Harry M. Pflager
By Cornwall, Bedell & James
Att'ys Patented Oct. 18, 1927.

1,646,214

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed December 18, 1925. Serial No. 76,209.

My invention relates to railway rolling stock and consists in an improved truck structure. A well-recognized type of truck structure is embodied in the provision of equalizing bars extending between adjacent journal boxes, the spring supporting of the truck frame upon the equalizing bars, and the spring carrying of the truck bolster by spring planks suspended from the truck frame. In such structures, it is customary to have the equalizer depressed between its ends to provide sufficient space between the frame and the equalizing bar for the frame supporting springs, and to provide clearance between the boltser supporting springs and the top of the equalizing bar, which passes under the bolster springs. Such structure requires a substantially larger equalizing bar than would be necessary if the bar could extend in a substantially straight line between the journal box and the described structure also renders it inconvenient to get at the brake beams and shoes for inspection or repair purposes.

The object of my invention is to eliminate the above disadvantages by providing an equalizer bar extending in a substantially straight line between the journal boxes and passing over the bolster springs carried on the spring plank.

An additional object of my invention is to facilitate the assembly of truck parts by the use of such an equalizing bar as the latter may be slid into the truck endwise through the pedestals or may be applied from below by inserting one end through the pedestals and up into the wheel piece when the other end will clear the inner face of the other pedestal and may be moved into its position over the journal box or the pedestal could have a removable inner face for the application of the equalizing bar from below. These methods of application are illustrated in my copending applications, Serial Numbers 718,516, 718,517, and 718,518, and 1,614, which illustrate and describe trucks having depressed equalizer bars.

My invention is particularly adapted for use on a four wheel truck and in the accompanying drawings,—

Figure 1 is a top view of the longitudinal half of a four wheel truck embodying my invention.

Figure 2 is a side elevation of the same.

Figure 3 is a transverse vertical section, the left half of which is taken on line a—a of Figure 1 with the bolster removed and the right half of which is taken on line b—b of Figure 1.

Figure 4 is a fragmentary side elevation showing a modification of my equalizing bar.

Figure 5 is a similar elevation showing another modification of my invention.

Figure 6 is a similar elevation showing another modification of my invention.

In the truck, the wheels, axles, and journal boxes are indicated at 1, 2, and 3, respectively, and an equalizing bar 4 has its ends resting on the tops of the journal boxes 3 in the usual manner. Adjacent each journal box the equalizer is depressed as indicated at 5 and each depressed portion carries a spring saddle 6. Between depressed portions 5 the equalizing bar is located at approximately the same level as above the journal boxes. The springs 7 which are seated on saddles 6 extend into downwardly facing pockets in wheel pieces 8 of the truck frame and support the latter and the transoms 9 of the frame pivotally suspend the spring plank 10 through swinging links 11 in the usual manner. The leaf springs 12 carried on the ends of the spring plank 10 support the truck bolster 13 and project beneath the middle portion 4 of the equalizer, which is elevated for the purpose of clearing these springs, and may project into an opening provided in the lower face of wheel piece 8.

The brake shoes 14 are carried on the beams (not shown) and are suspended by links 15 from a suitable support here shown as lugs 16 formed integrally on the truck frame. Owing to the contour of the equalizing bar, the brake shoes and their hangers are always visible and the parts may be easily reached when necessary.

In most railway equipment, the distance from the rail to the top of the wheel piece is limited to about thirty-five or thirty-six inches on account of the construction of car bodies and the height of the equalizing bar is determined by the size of the wheel and journal box and is usually so great that there is insufficient room beneath the top of the equalizer bar (if the same were straight) and the bottom of the wheel piece to receive a spring or to permit such relative vertical movement between the parts as is necessary to provide for yielding resistance to the car body. With the form of equalizer and wheel piece just described sufficient space may be provided for the normal springs or even for somewhat heavier or longer springs than are in general use for supporting truck frames on their equalizers.

In some types of car construction, the limitations may not be so close and it will be possible to have the equalizing bar extend in a straight line from box to box. In Figure 4, I illustrate a modification of my invention in which the equalizer bar 17 is straight, from end to end, without any depressions as indicated in Figure 2. The remaining truck parts being substantially the same as previously referred to except that the wheel piece 18 has no opening in its lower face for receiving the equalizing bar.

In Figure 5 the equalizing bar 19 is straight from the journal box 20 past the truck spring seat 21 and is then offset upwardly at 22 to clear the bolster springs 23, the wheel piece being adapted to receive the bar, if necessary.

In Figure 6 the equalizing bar 24 is depressed at 25 to accommodate the truck springs 26 and is then elevated to clear the bolster springs 27. The bar is shaped similarly to the bar shown in Figure 2 but the middle elevation is not so high and the wheel piece 28 does not necessarily receive the bar.

In all the forms of my invention, the equalizing bar passes beneath the frame carrying springs and over the bolster springs. I believe this is a new construction on trucks of this type and while various other modifications of the details of my invention may be made in the commercial development, I contemplate the exclusive use of such as are included in the scope of my claims.

I claim:

1. In a railway four wheel truck, a truck frame, a spring plank supported from said frame, bolster carrying springs on said spring plank, journal boxes spaced longitudinally of the truck and located near each end of said frame, an equalizing bar carried at its ends on said journal boxes and passing over said springs, and springs supporting said frame mounted on the top of said equalizing bar between said journal boxes and said bolster springs.

2. In a railway truck, a truck frame, a spring plank suspended from said frame, bolster springs carried by said plank, journal boxes, an equalizing bar supported at its ends on said journal boxes and carrying said frame and passing over said springs, said bar being depressed bodily between said journal boxes and said springs, and a frame carrying spring seated on the depressed portion of said bar.

3. In a railway truck, journal boxes, an equalizing bar supported at its ends on said boxes, springs mounted on said bar for carrying a truck frame, bolster springs beneath said bar carried by said frame, said equalizing bar being alternately elevated above and depressed below a given horizontal line so as to rest on said boxes to provide room for said frame carrying springs and to clear said bolster springs.

4. In a railway four wheel truck, journal boxes spaced longitudinally of the truck, an equalizing bar having its ends resting on said journal boxes and having horizontal portions depressed below the level of the tops of said journal boxes adjacent the sides of said boxes and having a middle horizontal portion elevated above the level of said depressed portions, springs mounted on said depressed portions of said bar, and a truck frame carried on said springs, a spring plank suspended from said frame, bolster springs carried on said spring plank and extending beneath said middle portion of said bar.

5. A railway truck equalizing bar having journal box engaging ends and being substantially straight from end to end but being alternately depressed and elevated between its ends to support frame carrying springs and to clear bolster carrying springs, respectively.

6. In a railway four wheel truck, a truck frame, springs beneath said frame and supporting the same, equalizing bars beneath said springs and supporting the same, bolster springs carried by said frame and extending beneath the middle portion of said bars, and removable brake shoes beneath said equalizing bars at the sides of said bolster springs.

7. In a railway truck, journal boxes, an equalizer bar carried by said journal boxes, truck springs mounted on said bar, a portion of said bar between said springs being elevated to clear truck bolster springs located between said truck springs and below the level of the same.

8. In a railway truck, a frame wheel piece having a recess in its lower face, journal boxes, an equalizing bar carried by said journal boxes, springs mounted on said equalizing bar and supporting said wheel piece, said equalizing bar having its middle portion elevated above its spring mounting portions and adapted to enter said wheel piece recess.

9. In a railway truck, a frame including a wheel piece having recesses in its lower face, journal boxes, an equalizing bar carried on said journal boxes, frame supporting springs mounted in said bar and seated in respective recesses in said wheel pieces, said bar being elevated intermediate said springs and adapted to enter a recess in said wheel piece especially when said springs are compressed.

10. In a railway truck, a frame including a wheel piece having recesses in its lower face, journal boxes, an equalizing bar carried by said journal boxes, frame supporting springs mounted in said bar, a spring plank suspended from said frame, bolster springs on said plank located beneath said bar, said bar being elevated above said bolster springs and adapted ot enter a recess in said wheel piece.

11. A railway truck equalizing bar of solid cross section throughout its length and having journal box engaging end portions and having its middle portion bodily elevated above the level of its end portions.

12. A railway truck equalizing bar having ends adapted to be supported on journal boxes and having spaced spring seats between said ends and having an intermediate portion between said seats elevated above the level of said seats.

In testimony whereof I hereunto affix my signature this 17 day of November, 1925.

H. M. PFLAGER.